United States Patent [19]

Conroy, Sr.

[11] Patent Number: 4,652,025
[45] Date of Patent: Mar. 24, 1987

[54] GIMBALLED CONDUIT CONNECTOR

[75] Inventor: John L. Conroy, Sr., Carson, Calif.

[73] Assignee: Planetics Engineering, Inc., Paramount, Calif.

[21] Appl. No.: 620,916

[22] Filed: Jun. 15, 1984

[51] Int. Cl.⁴ .............................................. F16L 13/04
[52] U.S. Cl. ..................................... 285/114; 285/226
[58] Field of Search ............... 285/265, 226, 227, 228, 285/229, 114

[56] References Cited

U.S. PATENT DOCUMENTS

| | | | |
|---|---|---|---|
| 2,232,657 | 2/1941 | Davis | 285/226 |
| 2,904,356 | 8/1956 | Love | |
| 2,936,185 | 5/1960 | Olsen et al. | |
| 3,112,129 | 11/1963 | Willis et al. | |
| 3,663,044 | 5/1972 | Contreras | 285/265 X |
| 3,907,337 | 9/1975 | Affa | |
| 3,915,482 | 10/1975 | Fletcher et al. | |
| 4,165,107 | 8/1979 | Affa | |

FOREIGN PATENT DOCUMENTS

| | | |
|---|---|---|
| 809656 | 2/1959 | United Kingdom . |
| 1278063 | 6/1972 | United Kingdom . |
| 282833 | 6/1976 | U.S.S.R. ............................. 285/226 |

Primary Examiner—Dave W. Arola
Attorney, Agent, or Firm—Poms, Smith, Lande & Rose

[57] ABSTRACT

A gimballed conduit connector for connecting two conduits transporting high temperature and pressure fluids. Rings having two parallel tabs are attached to the ends of two conduits that are to be connected. A coupler ring between the two tabbed rings has four tab pockets through which four pins are inserted to provide axles for the rotatable retention of the tabbed rings in the connector ring. A bellows around the rings seals the connection. Optimum flexibility and life of the connector is achieved by the gimballed pin and tab system and selection of high flexibility materials and dimensions for the bellows.

7 Claims, 3 Drawing Figures

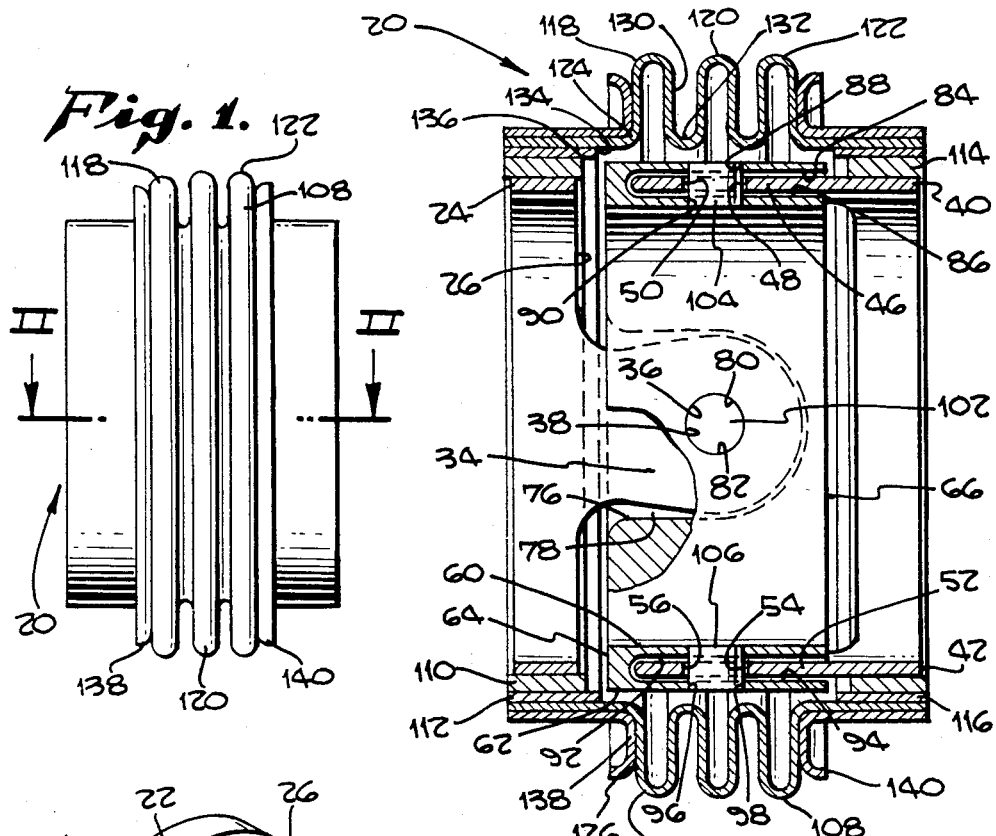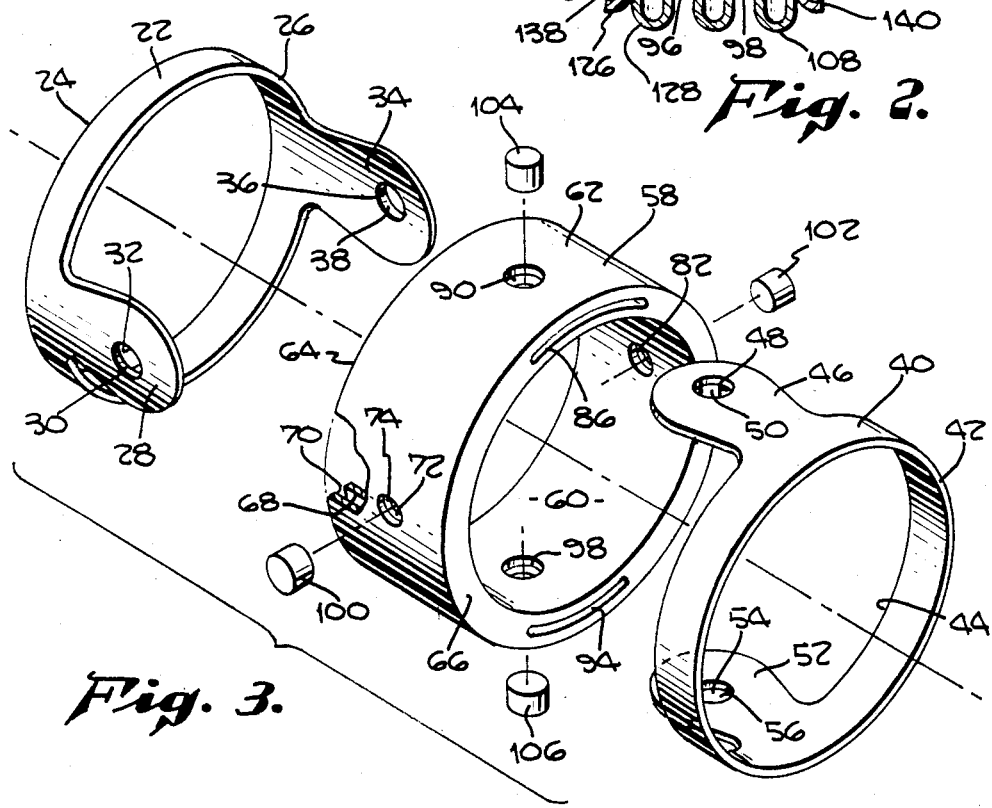

4,652,025

GIMBALLED CONDUIT CONNECTOR

BACKGROUND OF THE INVENTION

1. Field of the Invention

This invention relates to the conduit connector art and, more particularly, to a flexible conduit connector for high temperature and pressure systems encountered in jet aircraft applications.

2. Description of the Prior Art

The primary function of jet aircraft engines on jet airplanes is the propulsion of the aircraft. The jet engine is also used as a source of power and heat by the redirection of a portion of the hot compressed air, termed bleed air, through conduits to pressurize and heat the cabin, deice the wing and engine cowlings, and remove rain from the front windows. Most jet engines are also started by bleed air from small auxiliary jet engines located near the tail of the aircraft or in ground support units. This bleed air is directed from one main engine to another during the starting sequence through a series of conduits. In operation, an aircraft is subject to many forces which bend its structural components. Conduits carrying the heated gas from the jet engines are therefore required to bend with the other structures of the aircraft.

Numerous flexible joints have been developed for this purpose primarily of the ball socket type. U.S. Pat. No. 4,165,107 presents a recent example of this type of joint. A spherical socket is attached to one conduit which receives a spherical ball on another conduit. A second spherical socket inside the first spherical socket retains the ball between the two. A plurality of graphite buttons between the ball and second socket allows low friction angulation between the two connected conduits. A bellows inside the ball provides retention of the high temperature and pressure gas flowing through the conduits. As the pressures and temperature increase, the pressure inside the joint squeezes the ball portion against the socket portion making deflection increasingly difficult. Rapid wear of the sliding parts results producing early failure of the device. In addition, the location of the bellows inside the ball limits the geometry of the bellows to a relatively stiff configuration further increasing the force required to deflect the conduits in relation to each other.

Other types of joints utilize gimbals to secure one conduit to another such as illustrated in U.S. Pat. No. 3,907,337. Either a bellows or rigid sliding structure as shown in U.S. Pat. No. 3,907,337 is constructed around the gimbal to seal the high temperature and pressure gases flowing through the connector. Sealing rings, as shown in U.S. Pat. No. 3,907,337, provide a sliding sealing system which is subject to wear. In comparison with the U.S. Pat. No. 4,165,107 discussed in the previous paragraph, however, the problem in the U.S. Pat. No. 3,907,337 connector is the tendency for the seal to blow out instead of an increase in pressure at the sliding location. While the gimbal allows angulation between the conduits, the nature of the construction of the gimbal in U.S. Pat. No. 3,907,337 creates single sided shear forces leading to early failure of the gimbal. One gimbal portion is coupled to one end of an axle and the other gimbal portion is coupled to the other end of the axle. The pulling and pushing of one conduit in relation to the other during operation result in the bending of the axle and gimbal portions in the direction of the single sided shear forces. Eventually the multiple expansions and contractions of the joint cause the internal failure of the joint at the axle connections.

SUMMARY OF THE INVENTION

Accordingly, it is an object of the present invention to provide an improved flexible conduit connector.

It is another object of the present invention to provide an improved flexible conduit connector for conduits carrying high temperature and pressure fluids.

It is another object of the present invention to provide a flexible conduit connector having a low resistance to angulation.

It is another object of the present invention to provide a flexible conduit connector that has a long life under high temperature and pressure extremes.

It is another object of the present invention to provide a flexible conduit connector that angulates on axles instead of sliding balls and shells.

It is another object of the present invention to provide a flexible conduit connector that does not angulate on a seal.

It is another object of the present invention to provide a flexible conduit connector that does not interrupt or impede the flow of fluids therethrough due to the structure of the connector.

It is another object of the present invention to provide a flexible conduit connector that is easily fabricated.

It is another object of the present invention to provide a flexible conduit connector between a bellows seal where the geometry of the bellows is not restricted by the interconnection requirements of the connector.

It is another object of the present invention to provide a flexible conduit connector having a bellows type of seal where the bellows plays no part in the interconnection requirements of the connector.

The above, and other objects of the present invention are achieved, according to a preferred embodiment thereof, by providing a gimballed flexible conduit connector for connecting two conduits having a first tabbed ring with a rear surface coupled to one of the conduits and a front surface having two tabs located on opposite sides of the ring and parallel to each other with the first tab having first walls defining a first tab pin aperture and the second tab having second walls defining a second tab pin aperture in alignment with the first tab pin aperture. The rear surface of a second tabbed ring identical to the first tabbed ring is coupled to the other conduit. The front surface of the second tabbed ring has a third tab having third walls defining a third pin aperture and a fourth tab on the opposite side of the ring from the third tab having fourth walls defining a fourth tab aperture in alignment with the third tab pin aperture.

A coupler ring is fitted between the two tabbed rings having a structure different from that of traditional gimbal rings but providing the same function as to angularity. The coupler ring has an inner surface, an outer surface, a first end, and a second end. Fifth walls define a first tab pocket through the first end located between the inner surface and the outer surface. Sixth walls define a first tab pocket pin aperture through the coupler ring from the inner surface to the outer surface through the first tab pocket. Seventh walls define a second tab pocket through the first end between the inner and outer surfaces and spaced from the first tab pocket on the other side of the coupler ring. Eighth walls define a second tab pocket pin aperture through the coupler ring from the inner surface to the outer surface through the second tab pocket. Similar pockets are located on the other end of the coupler ring rotated 90° from the position of the first two tab pockets. Ninth walls define a third tab pocket through the second end and between the inner and outer surfaces. Tenth walls define a third tab pocket pin aperture through the coupler ring from the inner surface to the outer surface through the third tab pocket. Eleventh walls define a fourth tab pocket through the second end between the inner and outer surfaces and spaced from the third tab pocket on the opposite side of the coupler ring. Twelfth walls define a fourth tab pocket pin aperture through the coupler ring from the inner surface to the outer surface through the fourth tab pocket and in alignment with the third tab pocket pin aperture.

Four pins are utilized to provide axles for the tabbed rings in the coupler ring whereby two of the pins rotatably retain the first and second tabs of the first tabbed ring in the first and second tab pocket and the other two of the four pins rotatably retain the third and fourth tabs of the second tabbed ring in the third and fourth tab pockets.

Fabrication of the pockets may be achieved utilizing traditional mechanical methods utilizing drills, mills, or saws. Molding, chemical material removal, and electrical discharge milling may also be used. The preferred method is electrical discharge milling.

The preferred pocket does not pass from one end to the other in order to maximize the overall strength of the connector ring. In addition, a closed pocket also creates a closed air pocket which makes the introduction of abrasive materials into the area of the axle pins relatively impossible. The life of the conduit connector is thereby enhanced.

The strength of the coupler ring is also enhanced by minimizing the removal of material from the coupler ring during fabrication of the pockets to include only the minimum amount of material required for the desired angulation characteristics of the conduit connector. Thus, if a 5° design angulation is specified, the sides of the pockets are fabricated with angles only slightly greater than 5°.

Dry lubricants such as graphite may be introduced into the pockets and around the axle pins in order to further reduce the friction between the tab rings and the axle pins.

The primary mechanical advantage of the present invention in comparison to other connectors based on the gimbal principle resides in the elimination of the single shear structure between the axle bolts and the connector ring. The axle pins of the present invention are supported on both sides of the tab pockets by the connector ring. The axle pins are, thereby, made absolutely stable in relation to the connector ring. The tug or push of the tabbed rings on the axle pins is transmitted through the axle pins to the connector ring in two equal shear forces parallel to the inner and outer surfaces of the connector ring. This type of connection between the tabbed rings and the connector significantly enhances the operative life of the conduit connector and also decreases the friction between the tabbed rings and the axle pins because the tabbed rings and axle pins are always in perfect alignment.

In the traditional gimballed connection, the axle bolt passes from one of the tabbed rings into a connector ring. Instead of having two equal and parallel shear forces as in the present invention, single shear forces are present tending to cause the axle bolt to twist in the direction of the shear force and distort the metal through which the connector bolt passes resulting in a limited life for the traditional gimballed connector assembly. In addition, the one sided attachment throws the tabbed ring out of aligment with the bolt axle increasing friction where the bolt passes through the tabbed ring. Also, the one sided attachment presses the side of the tabbed ring into the side of the connector ring substantially increasing the friction between these two elements. The overall results of the traditional type of gimballed mounting under high stress is limited life and significant frictional resistance to angulation. All of these problems are eliminated in the present invention by the securing of the axle pin on both ends by the coupler ring.

A bellows assembly between the first and second tabbed rings seals the high temperature and pressure fluid passing through the conduits inside the conduit connector. Selection of the bellows geometry is designed to minimize the resistance to angulation and to maximize the life of the conduit connector. The bellows has a plurality of convolutions, at least three, each of which has a cross section substantially beginning with a 90° first round curve away from the inner diameter of the bellows, a first flat side wall, a 180° second round curve, a second flat side wall, and a 90° second round curve returning to the inner diameter of the bellows. All of the curves have the same radius of curvature. The distance between the flat walls either within a convolution or between convolutions is selected to be greater than one and one-half times, and preferably two times, the thickness of the material from which the bellows if fabricated. Also, the distance between the inner diameter of the bellows and the outer diameter is selected to be greater than two times, and preferably three times, the distance between the flat walls of the bellows. This significant increase in the width and height of the convolutions in comparison to traditional bellows in conduit connectors significantly enhances the life of the bellows assembly and reduces the force required to bend the hollows. Specifically, the increased distance between the flat walls spreads the bending force in the curves over a wider area of material thereby reducing the bending of the bellows at any given point. The fatigue life of the bellows material in the curves is thereby greatly increased. The increase in the height of the bellows convolutions increases the leverage of the side walls acting on the curved portions. The increased leverage decreases the amount of energy required to cause the desired bending in the curves.

The life of the bellows assembly is further enhanced by collar rings outside the bellows at each of the first and second tabbed rings having curved faces directed to the sides of the bellows substantially perpendicular to the axes of the collar rings which prevent the outer walls of the convolutions from flexing more than 90° when that particular side of the bellows is under compression. The collar rings also spread the compression and extension forces of the outer convolutions around the curved faces. Also, the rigid collars force all bending of the bellows during compression to take place in the center convolutions. The primary benefit of the collar rings is the elimination of fatigue failure of the bellows at the point where the bellows couple to the tabbed rings. In prior bellows assemblies, greater than average bending forces were concentrated at the point where the bellows material was coupled to the tabbed rings. Virtually all prior art bellows assemblies failed where they connected to the side structure rather than in the center of the bellows itself.

In order to avoid the constriction or interruption of the fluid flow through the conduit connector when the connector is not bent and also to minimize the constriction and interruption when the connector is bent, the inner diameter of the connector ring is selected to be the same or slightly larger than the diameter of the conduits themselves. In addition, the axle pins are not allowed to protrude inside the inner diameter of the ring. A smooth flow of the high pressure and temperature fluid is thereby assured along the inner diameter of the connector rings.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 1 is a side elevational view of a gimballed conduit connector of the present invention;

FIG. 2 is a sectional view along line II—II of FIG. 1;

FIG. 3 is a exploded perspective view of the tabbed rings, connector ring, and axle pins of the present invention.

DESCRIPTION OF THE PREFERRED EMBODIMENT

Referring now to the various figures of the drawing, there as illustrated in FIG. 1 a side elevational view of a gimballed conduit connector generally designated 20, of the present invention. Conduits which are not illustrated are welded on either side of connector 20 to provide a flexible sealed connection between the two conduits. FIG. 2 is a sectional view of connector 20 along line II—II of FIG. 1. FIG. 3 is an exploded prespective view of the tabbed rings, connector ring, and axle pins of the present invention. In FIGS. 2 and 3, connector 20 comprises a first tabbed ring 22 having a rear surface 24 for coupling to a conduit from the left. Front surface 26 is spaced from rear surface 24. First tab 28 having first walls 30 defining a first tabbed pin aperture 32 therethrough is located on front surface 26. Second tab 34 is located on the other side of first tabbed ring 22 on front surface 26 from first tab 28. Second tab 34 has second walls 36 defining second tab aperture 38 which is in alignment with first tab pin aperture 32.

Second tabbed ring 40 is identical to first tabbed ring 22 and is rotated 90° from the axis of first and second tabbed pin apertures 32 and 38. Second tabbed ring 40 has rear surface 42 for coupling to a conduit from the right side. Front surface 44 is spaced from rear surface 42 and has a third tab 46 with third walls 48 defining a third tab pin aperture 50 therethrough. A fourth tab 52 on the other side of second tabbed ring 40 from third tab 46 has fourth walls 54 defining fourth tab pin aperture 56 therethrough. Fourth tab aperture 56 is in alignment with third tab pin aperture 50.

Coupler ring 58 has inner surface 60, outer surface 62 spaced from inner surface 60, first end 64, and second end 66, spaced from first end 64. Fifth walls 68 define first tab pocket 70 through first end 64 and between inner surface 60 and outer surface 62. Sixth walls 72 define a first tab pocket pin aperture 74, through coupler ring 58 from inner surface 60 to outer surface 62 through first tabbed pocket 70. Seventh walls 76 define second tab pocket 78 through first end 64 between inner and outer surfaces 60 and 62 and spaced from first tab pocket 70 on the opposite side of coupler ring 58. Eighth walls 80 define second tab pocket pin aperture 82 through coupler ring 58 from inner surface 60 to outer surface 62 through second tab pocket 78 which is in alignment with first tab pocket pin aperture 84.

Ninth walls 84 define third tab pocket 86 through second end 66 and between inner and outer surfaces 60 and 62. Tenth walls 88 define third tab pocket pin aperture 90 through coupler ring 58 from inner surface 60 to outer surface 62 through third tab pocket 86 and located 90° from first and second tab pocket pin apertures 74 and 82. Eleventh walls 92 define fourth tab pocket 94 through second end 66 between inner and outer surfaces 60 and 62 and spaced from third tab pocket 86 on the opposite side of coupler ring 58. Twelfth walls 96 define fourth tab pocket pin aperture 98 through coupler ring 58 from inner surface 60 to outer surface 62 which is in alignment with third tab pocket aperture 90.

Assembly of the gimbal portion of the conduit connector 20 is achieved by inserting first tab 28 into first tab pocket 70 and second tab 34 into second tab pocket 78. Then, pin 100 is inserted into first tab pocket pin aperture 74 through first tab pin aperture 32. Second pin 102 is inserted through second tab pocket pin aperture 82 through second tab pin aperture 38. First tabbed ring 22 is thereby rotatably retained in coupler ring 58.

Similarly, third tab 46 is inserted into third tab pocket 86 and fourth tab 52 is inserted into fourth tab 94. Third pin 104 is inserted into third tab pocket pin aperture 90 through third tab aperture 90. Fourth pin 106 is inserted through fourth tab pocket pin aperture 98 through fourth tab pin aperture 56. Second tabbed ring 40 is thereby rotatably retained in coupler ring 58.

Bellows 108 in FIGS. 1 and 2 closes the spaces between first and second tabbed rings 22 and 40 and coupler ring 58. As shown in FIG. 2, bellows 108 is connected to first tabbed ring 22 through spacer 110 and stiffner 112. Similarly, bellows 108 is connected to second tabbed ring 40 through spacer 114 and stiffner 16.

Bellows 108 has a plurality of convolutions 118, 120, 122. Each convolution has a cross section substantially beginning with 90° first round curve 124 away from the inner diameter of bellows 108, first flat side wall 126, 180° second round curve 128, second flat side wall 130, and 90° second degree round curve 132 returning to the inner diameter of bellows 108. All of curves 124, 128 and 132 have the same radius of curvature. Thus, convolution 118 begins in FIG. 2 in the upper left hand corner after the horizontal portion of bellows 108 where first curve 124 begins bending upward. Convolution 118 ends where curve 132 ends its downward curve and begins turning upward. Convolution 120 takes over at that point to repeat the pattern. Convolution 122 begins at the bottom of the second lower portion of bellows 108 moving from the left to right and ends at the start of the horizontal portion that continues to the right hand side of coupler 20.

The selection of the geometry of the convolutions 118, 120 and 122 of bellows 108 is designed to maximize the life and flexibility of bellows 108. In prior conduit connectors having bellows, the bellows usually failed where the flexible portion of the bellows was coupled to the rigid sides. While FIG. 2 does not represent a traditional coupler having a traditional bellows, such a point would be represented at point 134. Stiffner ring 112 in the present invention has moved the position some what from 136 to 134. The object of stiffner ring 112 is to decrease the leverage between the rigid connection on the left at point 136 and first round curve 124. The longer the lever in this area, the greater the concentration of forces on the section of bellows 108 between the flexible portion of bellows 108 and the rigid portion secured to the side elements.

Leverage is also important within curves 124, 128 and 132. Fabrication of all the curves with the same radius of curvature creates equal leverage acting on the curves thereby causing each curve to flex equally when bellows 118 is flexed. Extra flexing of a particular portion of a curve in comparison to other curved portions is thereby minimized eliminating a fatigue situation which might cause early failure of bellows 108.

In order to avoid undue stressing within the material from which the curves are fabricated, the distance between flat walls 126 and 130 is selected to be greater than one and one-half times the thickness of the material from which bellows 108 is fabricated. Preferably, the distance between flat walls 126 and 130 is twice the thickness of the material from which bellows 108 is fabricated.

The height of bellows 108, which is the distance between the inner diameter and the outer diameter, is selected to be greater than two and a half times the distance between flat walls 126 and 132. Preferably, the height is three times the distance between flat walls 126 and 132. The height is determined both by the radius of curves 124, 128 and 132 and the length of first flat side wall 126 and second flat side wall 130. Side walls 126 and 130 act as levers on curves 124, 128 and 132. The longer the levers—the less force required to bend the curves. The selection of the long lengths of the side walls in the present invention is designed to decrease the force required to bend the curves and thereby increase the flexibility of the overall bellows assembly. Prior inventions have had a relatively low bellows heights requiring greater force to bend the bellows curves.

In order to further lengthen the life of bellows 108, collar rings 138 and 140 are positioned outside bellows 108 at each of first and second tabbed rings 22 and 40. Curved faces are directed to bellows 108 substantially perpendicular to the axes of the collar rings 138 and 140 respectively preventing the outer convolutions 118 and 122 of bellows 108 from flexing more than 90° when the particular side of bellows 108 is under compression. The curved faces also spread the compression forces of the outer convolutions 118 and 122 around the other curved faces of the bellows. Also, by limiting the movement of the outer sides of bellows 108 on the particular side of the bellows under compression, the curved faces of the collar rings throw all of the bending action to the other convolutions and curves of bellows 108. Instead of high stress conditions being imposed on bellows 108 at point 134 or point 136 as would have been the case in prior art bellows resulting in failure of the bellows assembly at one of those points, bellows 108 must bend in the center section equally over a multitude of curves which, thereby, substantially increases the life of bellows 108 in comparison to prior art bellows.

In order to minimize air flow turbulence through conduit connector 20, the inner diameter of coupler ring 58 is the same as or larger than the inner diameters of the conduits which are placed on either side of conduit connector 20. Also, all four pins 100, 102, 104, and 106 are located outside of the inner diameter of coupler ring 58. The flow of the fluid through conduit connector 20 when the conduit connector is straight is not constricted, expanded or interrupted. When conduit connector 20 is bent, the respective diameters and placement of the pins minimize the turbulence in the fluid flowing through conduit connector 20.

Having now reviewed the above description and the drawing, those skilled in the art will realize that a wide variety of embodiments may be employed in producing equipment in accordance with the invention. In many, instances such embodiments will not even resemble that depicted here and may be used for applications other than that shown and described. Nevertheless, such embodiments will employ the spirit and scope of the invention as set forth in the following claims.

I claim:

1. A gimballed conduit connector for connecting two conduits transporting high temperature and pressure fluid comprising:

three relatively articulate tubular members including first and second end rings for attachment to the ends of said two conduits, said end rings each having two generally parallel spaced tabs extending axially outwardly thereof and a coupler ring between the end rings and pivotally secured thereto by pins extending through said end rings tabs and portions of said coupler ring, and wherein said coupler ring comprises a one piece integral tubular member including an annular body defined by generally concentric inner and outer circular cross section surfaces, two pairs of oppositely facing and individually discrete tab receiving pockets hollowed out integrally of said body between said surfaces, each of said pockets being closed in axially inwardly directions and opening only axially outwardly of said body, each of said end ring tabs being individually received in a corresponding one of said discrete pockets.

2. The connector defined in claim 1 further comprising:

bellows means positioned about said three tubular members to provide an air seal of the connector made by said tubular members between said two conduits, wherein said bellows has a plurality of convolutions, each of said convolutions having a cross section substantially beginning with a 90° first round curved away the inner diameter of said bellows, a first flat side wall, a 180° second round curve, a second flat side wall, and a 90° second round curve returning to the inner diameter of said bellows wherein all of said curves have the same radius of curvature.

3. The connector defined in claim 1 further comprising:

bellows means positioned about said three tubular members to provide an air seal of the connection made by said tubular members between said two conduits, wherein said bellows has a plurality of convolutions, each of said convolutions having a cross section substantially beginning with a 90° first round curved away the inner diameter of said bellows, a first flat side wall, a 180° second round curve, a second flat side wall, and a 90° second round curve returning to the inner diameter of said bellows wherein all of said curves have the same radius of curvature, and wherein the distance between the inner diameter of said bellows and the outer diameter is substantially three times the distance between said flat walls of said bellows.

4. The connector defined in claim 1 and further comprising:

bellows means having flexible convolutions and being positioned about said three tubular members to provide an air seal of the connection made by said tubular members between said two conduits, and collar rings about portions of said bellows positioned about portions of each of said first and second end rings, said collar ring having curved faces directed toward outer ones of said convolutions of said bellows substantially perpendicular to the axes of said collar rings preventing the outer convolutions of said bellows from flexing relative to the adjacent portions of said bellows within said end rings when the bellows is under compression.

5. A gimballed conduit connector for connecting two conduits transporting high temperature and pressure fluids comprising:

three relatively articulated tubular members including first and second end rings for attachment to the ends of said two conduits, said end rings each having two generally parallel spaced tabs extending axially outwardly thereof and a coupler ring between the end rings and pivotally secured thereto by pins extending through said end rings tabs and portions of said coupler ring, and wherein said coupler ring comprises a one piece integral tubular member including an annular body defined by generally concentric inner and outer circular cross section surfaces, a plurality of hollowed out tab receiving pockets formed in said body between said surfaces and opening axially outwardly of said body in opposite directions, said end ring tabs being received in said pockets;

bellows means positioned about said three tubular members to provide an air seal of the connection made by said tubular members between said two conduits and having flexible convolutions; and collar rings about portions of said bellows receiving portions of said first and second end rings, said collar rings having curved faces directed to said bellows convolutions substantially perpendicular to the axes of said collar rings preventing outer ones of said convolutions of said bellows from flexing when said bellows is under compression by said end rings.

6. The connector defined in claim 5 wherein the distance between the inner diameter of said bellows and the outer diameter is substantially three times the distance between said flat walls of said bellows.

7. A gimballed conduit connector for connecting two conduits transporting high temperature and pressure fluids comprising:

three relatively articulated members including first and second end rings for attachment to the ends of said two conduits, said end rings each having at least one tab extending axially outwardly thereof and a coupler ring between the end rings and pivotally secured thereto by pins extending through said end rings tabs and portions of said coupler rings, and wherein said coupler ring comprises a member including two pairs of oppositely facing and individually discrete tab receiving pockets formed integrally therein, each of said discrete pockets having closed in an axially inwardly direction and opening only in an axially outward direction, one of said end ring tabs being received in each one of said pockets.

* * * * *